No. 698,473. Patented Apr. 29, 1902.
J. F. DUFFIN.
HARROW TOOTH FASTENER.
(Application filed May 4, 1901.)
(No Model.)

WITNESSES:
E. Johnson
E. J. Abrsol

INVENTOR:
James F. Duffin,
By L. M. Thurlow
Att'y.

UNITED STATES PATENT OFFICE.

JAMES F. DUFFIN, OF AVERYVILLE, ILLINOIS, ASSIGNOR TO KINGMAN PLOW COMPANY, OF PEORIA, ILLINOIS, A CORPORATION OF ILLINOIS.

HARROW-TOOTH FASTENER.

SPECIFICATION forming part of Letters Patent No. 698,473, dated April 29, 1902.

Application filed May 4, 1901. Serial No. 58,817. (No model.)

*To all whom it may concern:*

Be it known that I, JAMES F. DUFFIN, a citizen of the United States, residing at Averyville, in the county of Peoria and State of Illinois, have invented certain new and useful Improvements in Harrow-Tooth Fasteners; and I do hereby declare that the following is a full, clear, and exact description of the invention, which will enable others skilled in the art to which it appertains to make and use the same.

This invention pertains to means for fastening the teeth of spike-harrows to their frames.

The object of said invention is to provide a cheap and simple fastener for this purpose and one that is perfectly reliable and will not become loosened.

A further object is to produce a fastening having no cast-iron parts in its construction to become broken.

Still another object is to furnish a harrow-tooth fastener of peculiar construction whose parts will lock the more firmly together as they are tightened.

Figure 1:
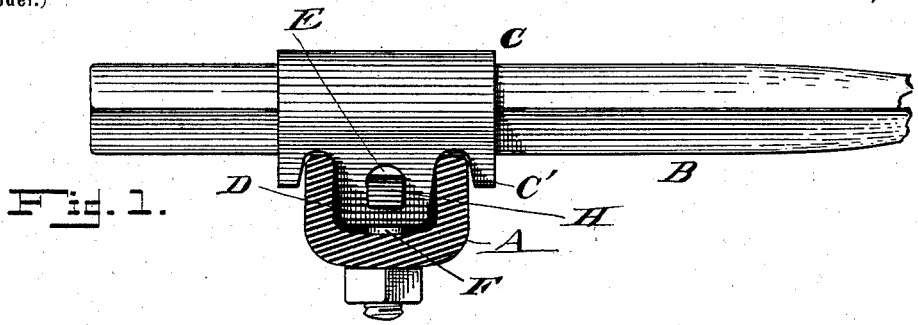
Figure 2:
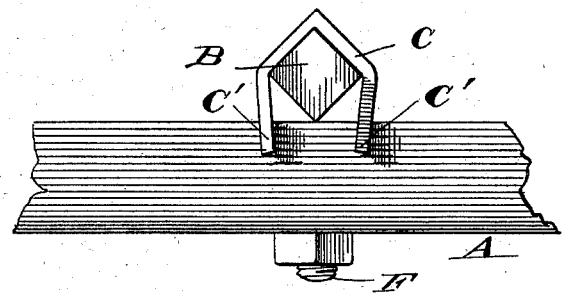
Figure 3:
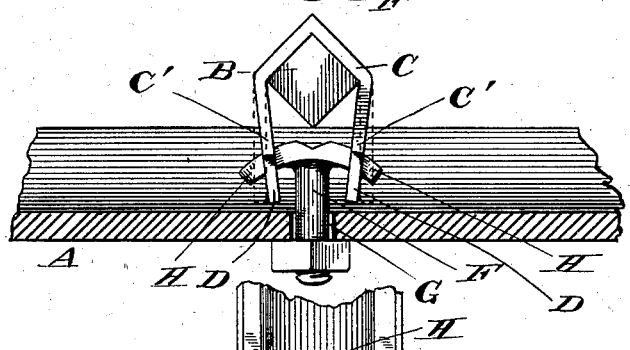
Figure 4:
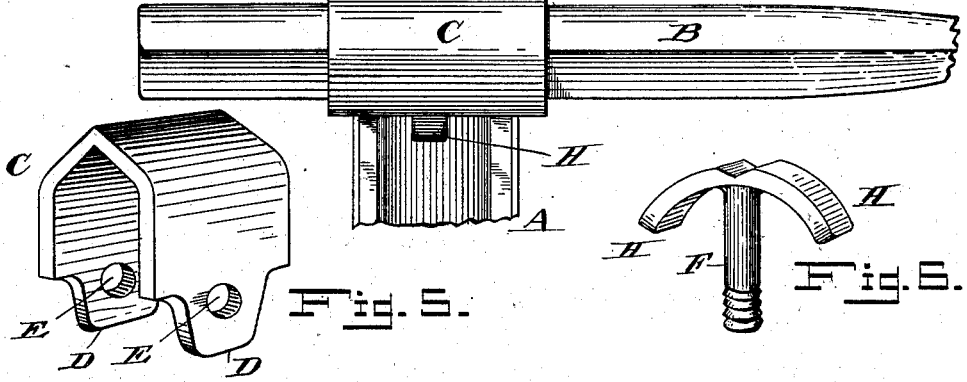
Figures 5, 6:
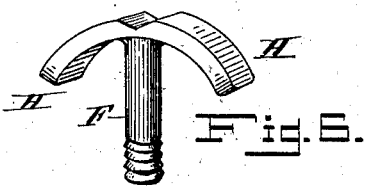

In the accompanying drawings, Figure 1 is a side view of the fastener and its tooth as applied to the bar of the harrow. Fig. 2 is an end view of the fastener and tooth and the side of the supporting-bar. Fig. 3 is also an end view of the fastener and tooth and the means for tightening the fastener, all being shown in connection with the supporting-bar, which is shown in longitudinal section. Fig. 4 is a plan view of the fastener, tooth, and bar. Fig. 5 is a perspective view of a slightly-modified form of a saddle forming part of the fastener. Fig. 6 is a perspective view of a T-bolt used to tighten the fastener.

In the figures, A represents a U-bar usually used in forming the framework of harrows of this class, and B is the harrow-tooth, mounted thereon at right angles to its length.

C is a saddle stamped and formed from sheet iron or steel. This saddle is formed in the shape of a U, and its extremities are reduced in width to form the tongues D D, which are opposite one another. The tongues so formed are inserted in the hollow of the U-bar A, and each is provided with an aperture. A T-bolt F passes through a bolt-hole G in the bottom of the U-bar, and the extremities H H of said bolt are passed into said apertures E and interlock with the tongues, as shown in Fig. 3. After inserting the tooth in the saddle the nut F' is tightened, thus drawing the saddle down against said tooth and locking it against the U-bar. The tongues D D are substantially parallel with each other, as shown in Fig. 3 in dotted lines and in Fig. 5, so that the extremities of the T-bolt may be entered into the apertures E without having to spread the tongues to admit them. The head of the bolt is formed in the arc of a circle and so arranged that the under surfaces of the extremities slant upward from the ends to the middle, as shown. Now when the nut F' is tightened it is evident that the tongues will gradually be brought toward each other, for the reason that they will follow the curve as long as the bolt is tightened. It will be seen that as the nut tightens the saddle will be more firmly drawn down upon the tooth and the latter upon the U-bar A. The tongues are never made so that they will seat in the bottom of the bar when drawn down to the full limit.

In Fig. 1 I have shown extensions C' on the saddle, which project outside the limbs of the U-bar to prevent the said limbs spreading by the great pressure brought to bear upon them. These projections are used when U-bars of very light weight are employed. In Fig. 5 these extensions are omitted, and I desire to make it understood that such portions are not absolutely necessary, but may be used for the purpose described when using the lighter weight of material, as in the heavy bars now used they are wholly unnecessary.

I have shown a groove in the upper surface of the head of the T-bolt; but this need not be used, as I employ it merely to permit the tooth being more readily entered into the saddle in case any deviation in the sizes of any of the parts should result during their construction.

I may alter the construction of my tooth-fastener in a number of ways and still accomplish the desired end without departing from the spirit and intent of my invention.

I claim—

1. In a harrow-tooth fastener the combination of the U-bar A forming the support for the harrow-teeth, the tooth B seated on the said bar at right angles to its length, the saddle C also in form of a U the same being seated to straddle the tooth, the extremities D thereof extending into the hollow of the bar A, an aperture in each extremity D, a T-bolt F having its free end projecting through the bottom of the said bar and each of its upper extremities engaging with the aperture G in the said extremities D, said T-bolt adapted, when its nut is tightened, to draw the saddle down to clamp the tooth to the U-bar as set forth.

2. In a harrow-tooth fastener, the combination of the U-bar A, the harrow-tooth B seated therein across the limbs thereof, the saddle C seated upon the tooth, the extensions D on the saddle the same depending within the U-bar, the bolt F projecting through the bottom of said bar, the extensions H H on the top of the bolt in the form of a semicircle, apertures G in the extensions D for receiving the said extensions H H, the relation of the parts being such that when the bolt is drawn down by means of its butt the extensions D will be drawn toward each other by reason of the upwardly-inclined extensions H to tightly inclose the tooth B as set forth.

3. In a harrow-tooth fastener, the combination of the U-bar A, the teeth B seated across the limbs of the said bar at right angles thereto, the saddle C straddling the said tooth, the extensions D of said saddle, the same extending into the recess of the U-bar, an aperture in each extremity of the extensions D, a T-bolt F passing through the bottom of the U-bar, the upper extensions H thereof lying within the said apertures and arranged whereby when the bolt is tightened the saddle will be drawn down and the extensions D thereof brought toward each other as set forth, and the projections C' on the saddle for preventing the spreading of the limbs of the said U-bar as set forth.

4. A tooth-fastener for harrows comprising a U-shaped support for the tooth, the tooth lying against the support on the extremities thereof and at right angles to their length, a saddle for straddling the tooth, said saddle projecting downward at each side of the tooth, part thereof extending into the hollow of the U-bar and having an aperture in each, a part extending outside of each extremity as shown, a T-bolt located between the extensions of the saddle within the U-bar the arms thereof engaging the apertures of the saddle extensions substantially as set forth, the bolt portion of said T-bolt passing through the U-bar and held by a nut, the arms of said bolt extending downward at an angle through the apertures of the saddle extensions whereby when the bolt is tightened the saddle extensions are made to move up the angled extensions and approach each other as described and whereby also, the outside projections of the saddle are drawn down outside the U-bar and prevent the spreading of the extremities of the same.

In testimony whereof I affix my signature in presence of two witnesses.

JAMES F. DUFFIN.

Witnesses:
  S. H. HUNT,
  W. B. KINGMAN.